(12) United States Patent
Pittman

(10) Patent No.: US 10,621,621 B1
(45) Date of Patent: *Apr. 14, 2020

(54) PLATFORM FOR LOCATION AND TIME BASED ADVERTISING

(71) Applicant: BoardActive Corporation, Atlanta, GA (US)

(72) Inventor: Douglas L. Pittman, Douglasville, GA (US)

(73) Assignee: BoardActive Corporation, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/718,407

(22) Filed: Dec. 18, 2019

Related U.S. Application Data

(63) Continuation of application No. 15/483,790, filed on Apr. 10, 2017, now Pat. No. 10,521,822.

(51) Int. Cl.
| | | |
|---|---|---|
| *G06Q 30/02* | (2012.01) | |
| *H04W 4/02* | (2018.01) | |
| *H04L 29/08* | (2006.01) | |

(52) U.S. Cl.
CPC ..... *G06Q 30/0261* (2013.01); *G06Q 30/0242* (2013.01); *G06Q 30/0264* (2013.01);
(Continued)

(58) Field of Classification Search
CPC .......... G06Q 30/0261; G06Q 30/0242; G06Q 30/0264; G06Q 30/0267; G06Q 30/0277;
(Continued)

(56) References Cited

U.S. PATENT DOCUMENTS

| | | |
|---|---|---|
| 8,271,413 B2 | 9/2012 | Agarawal et al. |
| 8,417,258 B2 | 4/2013 | Barnes, Jr. |

(Continued)

FOREIGN PATENT DOCUMENTS

WO   2016043663 A1   3/2016

OTHER PUBLICATIONS

International Search Report and Written Opinion dated Jun. 29, 2018 cited in Application No. PCT/US2018/26965, 8 pgs.

(Continued)

*Primary Examiner* — Colleen A Hoar
(74) *Attorney, Agent, or Firm* — Bekiares Eliezer LLP

(57) ABSTRACT

Disclosed is a method and system (collectively "platform") of geolocation and time-based advertising. The platform may include receiving, using a communication interface, a first geolocation from a client device. Further, the platform may include, receiving, using the communication interface, an advertisement content from the client device. Additionally, the platform may include creating, using the processor, an association between the first geolocation and the advertisement content. Further, the platform may include storing, using a storage device, each of the first geolocation, the advertisement content and the association. Furthermore, the platform may include receiving, using the communication interface, a second geolocation from a client device. Additionally, the platform may include comparing, using the processor, the second geolocation with the first geolocation. Further, the platform may include transmitting, using the communication interface, the advertisement content to the client device based on the comparison.

20 Claims, 21 Drawing Sheets

(52) U.S. Cl.
CPC ..... *G06Q 30/0267* (2013.01); *G06Q 30/0277* (2013.01); *H04L 67/18* (2013.01); *H04L 67/26* (2013.01); *H04W 4/023* (2013.01); *H04L 67/22* (2013.01); *H04L 67/34* (2013.01)

(58) Field of Classification Search
CPC ......... H04L 67/18; H04L 67/26; H04L 67/22; H04L 67/34; H04W 4/023
See application file for complete search history.

(56) References Cited

U.S. PATENT DOCUMENTS

| | | | |
|---|---|---|---|
| 8,996,035 | B2 | 3/2015 | Busch |
| 9,047,650 | B2 | 6/2015 | Strode |
| 9,373,123 | B2 | 6/2016 | Carlson et al. |
| 9,674,660 | B1 | 6/2017 | Vaynblat et al. |
| 9,918,197 | B2 | 3/2018 | Labarca |
| 10,521,822 | B2 | 12/2019 | Pittman |
| 2002/0009978 | A1 | 1/2002 | Dukach et al. |
| 2006/0036494 | A1 | 2/2006 | Aufricht et al. |
| 2008/0214150 | A1 | 9/2008 | Ramer et al. |
| 2009/0149199 | A1 | 6/2009 | Maghoul |
| 2009/0197616 | A1 | 8/2009 | Lewis et al. |
| 2011/0145068 | A1 | 6/2011 | King et al. |
| 2013/0060640 | A1 | 3/2013 | Gadhia et al. |
| 2013/0073388 | A1 | 3/2013 | Heath |
| 2014/0143060 | A1 | 5/2014 | Fernandez |
| 2015/0006278 | A1 | 1/2015 | Di Censo et al. |
| 2016/0196582 | A1 | 7/2016 | Stone et al. |
| 2016/0232572 | A1 | 8/2016 | East et al. |
| 2016/0292713 | A1 | 10/2016 | Chen et al. |
| 2017/0161784 | A1 | 6/2017 | Malik |
| 2018/0197205 | A1 | 7/2018 | Labarca |
| 2018/0293617 | A1 | 10/2018 | Pittman |
| 2018/0300761 | A1 | 10/2018 | Pittman |

OTHER PUBLICATIONS

International Preliminary Report on Patentability dated Apr. 29, 2019 cited in Application No. PCT/US2018/26965, 29 pgs.
U.S. Non-Final Office Action dated Oct. 3, 2019 cited in U.S. Appl. No. 15/950,019, 23 pgs.

BOARDS

Add Board

| Name | Your Stats | Notes | Description | Coupon | Logo | Delete? |
|---|---|---|---|---|---|---|
| BoardActive | Views: 57<br>Action: 0<br>Saves: 4<br>Shares: 1 | Test... | Come See Our Promotions... | | | × |
| Design Landscapes | Views: 39<br>Action: 0<br>Saves: 5<br>Shares: 8 | | The Lion, the Watch, end the Wardrobe Theater Production... | | | × |
| Upward Technology | Views: 19<br>Action: 0<br>Saves: 1<br>Shares: 0 | | Demo BillBoard... | | | × |

900

*1000*

ADD BOARD

Advertiser: BoardActive
Don't see your advertiser? Add them.

Category: Technology

Name

Board Notes

Description

Locating your Board

There are several ways to locate your Board within our network.

Please use one the following methods:
-Pin the Board on the map below
-OR Enter an Address below the map
-OR Enter the Latitude and Longitude Coordinates directly Address ⊙                714 Stagecoach Rd, Stockbridge, G Latitude                 33.577598020546164

Longitude                -84.24173355451785

*1300*

MY ADVERTISERS

(+) Add Advertiser

| Name | Board | Users | Delete? |
|------|-------|-------|---------|

Dashboard   Admin   Edit My Info   Advertisers   Users   Boards   Tools   Logout

Attractions

Education

Entertainment

Finance

Food

Health and Fitness

Kids

Legal

Lifestyles

Media

PLATFORM FOR LOCATION AND TIME BASED ADVERTISING

RELATED APPLICATION

This application is a continuation of U.S. application Ser. No. 15/483,790 filed Apr. 10, 2017, which issued as U.S. Pat. No. 10,521,822 on Dec. 31, 2019, which is hereby incorporated by reference herein in its entirety.

It is intended that the above-referenced application may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to the field of advertising. More specifically, the present disclosure relates to an online platform for managing geolocation and time-based advertising and methods for managing and/or delivering location and time-based advertisements.

BACKGROUND

Outdoor advertising is a very common and powerful mode of disseminating information to users. Typically, outdoor advertising involves use of signage (e.g., a billboard, T.V., or other viewable advertisement) installed at public places such as, for example, roadways, bus/train stations, airports, shopping centers, parking spaces, etc. Further, these signages are usually managed by an advertising agency that rents the signage to different advertisers for a predetermined time period. New media now allows online placements in a similar way to billboard advertising.

However, while signages have proven to be an attractive means of advertising, they suffer from several drawbacks. For example, adverse weather such as fog, rain etc. greatly affects visibility of a signage to nearby users. Further, in order to provide visibility in low light conditions, such as during night, external lighting systems are needed which increases cost. Additionally, presence of extraneous objects such as trees, buildings, etc. partially or completely occludes a signage resulting in poor visibility to users. Furthermore, for signage situated at locations, such as along highways, where users are always moving, sufficient exposure of advertisements to users may not be possible. It is therefore more difficult for the users to memorize the information of the advertisements.

Further, with existing methods of advertising using signage, neither the advertising agency, media buyer, reseller, nor the advertiser are able to determine reach and/or effectiveness of the advertisements. In other words, the advertiser is currently unaware about analytical information relating to consumption and usage of the advertisements on signage. Accordingly, advertisers are disadvantaged with regard to improving effectiveness of advertisements on signage or other advertising mediums such as, for example, but not limited to TV, real estate and other static, traditional, virtual, 3D, holographic, and other digital signage platforms. Digital signage may also be known as 'dynamic signage', and 'digital streaming'. If you work in marketing, design, IT, or PR, you've likely come across a digital signage scenario that asks for your expertise. Digital signage is used across a wide portfolio. You see it in schools, convenience stores, hospitals, universities, receptions, sporting events, bus stops, malls and more. It's used to inform, educate, entertain and sell.

Over the years, the digital signage industry has adapted. What was once expensive, difficult and only available to the big brands of the world is now accessible by everyone. For the independent restaurateurs and the corner shops, as much as the big brands and signage.

Digital signage includes the provision of content (video, images, adverts, presentations) to a digital device such as a TV screen, tablet, iPad or kiosk. Digital signage may be used in both public and private areas, including, for example, schools, stores and waiting rooms, to restaurants, bus stops and airports. Digital signage can also sometimes be called 'digital OOH', 'digital out-of-home' or 'dynamic signage' but all effectively refer to the same thing.

Advertising on digital signage is currently non-interactive. In other words, subsequent to a user viewing an advertisement on a digital signage, there may be no immediate action performable by the user as a result of viewing the advertisement. Typically, the user needs to remember or note writing information from the advertisement and perform a related action later by, for example, going online, calling a phone number, making a purchase, etc. Accordingly, the user is burdened with remembering or writing down information or taking a picture. As a result, a large number of users choose to ignore the advertisement, thus reducing the reach and/or effectiveness of the advertisement.

Therefore, there is a need for improved methods and systems for advertising in outdoor and indoor locations.

BRIEF OVERVIEW

A platform for location and time-based advertisements and methods for managing and/or delivering location and time-based advertisements may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Disclosed is a method of geolocation and time-based advertising. The method may include generating, using a processor, a Graphical User Interface (GUI) or a Visual User Interface (VUI), which may be used interchangeably herein, configured to be displayed on a client device. A client device may include a plurality of different computing devices. Additionally, the method may include transmitting, using a communication interface, the GUI to the client device. The transmission may be performed via a modem configured to the device. Further, the method may include receiving, using the communication interface, a first geolocation from the client device based on a user interaction with the GUI. Furthermore, the method may include, receiving, using the communication interface, an advertisement content from the client device. Additionally, the method may include creating, using the processor, an association between the first geolocation and the advertisement content. Further, the method may include storing, using a storage device, each of the first geolocation, the advertisement content and the association. Furthermore, the method may include receiving, using the communication interface, a second geolocation from a mobile device. Additionally, the method may include comparing, using the processor, the second geolocation with the first geolocation. Further, the method may include transmitting, using the communication interface, the advertisement content to the mobile device based on the comparing.

Also disclosed is an online platform for geolocation and time-based advertising. The online platform may include a communication interface configured to: transmit a GUI to a client device; receive a first geolocation from the client device based on a user interaction with the GUI; receive an advertisement content from the client device; receive a second geolocation from a mobile device; and transmit the advertisement content to the mobile device based on a comparison between the first geolocation and the second geolocation. Additionally, the online platform may include a processor configured to: generate the GUI configured to be displayed on the client device; create an association between the first geolocation and the advertisement content; compare the second geolocation with the first geolocation. Further, the online platform may include a storage device configured to store each of the first geolocation, the advertisement content and the association.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 10 illustrates a screenshot 1000 of a GUI for receiving information regarding traditional or digital signage to be added on the online platform, in accordance with some embodiments.

FIG. 13 illustrates a screenshot 1300 of a GUI for adding one or more advertisers on the online platform, in accordance with some embodiments.

DETAILED DESCRIPTION

Figure 1:
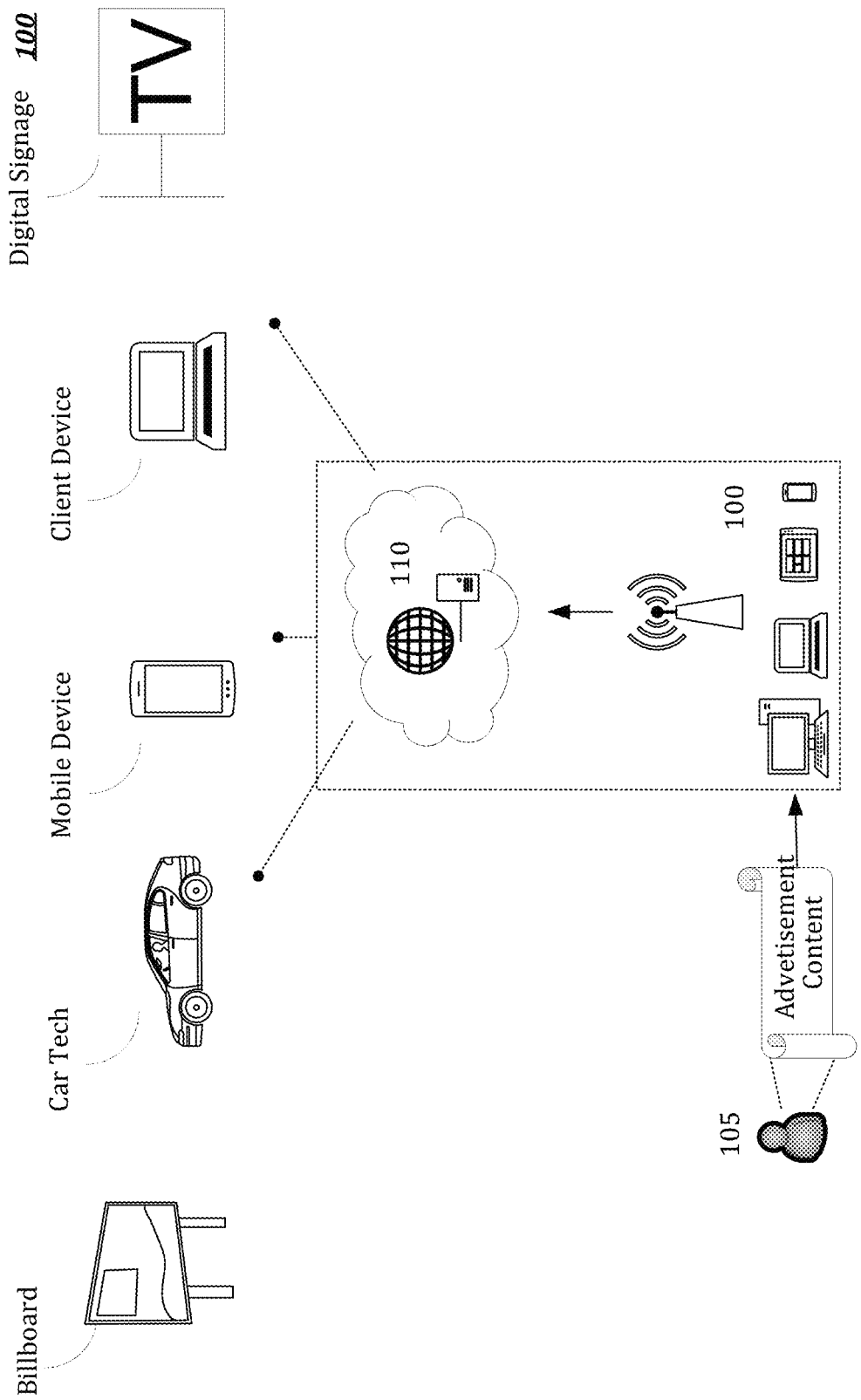
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. As should be understood, any embodiment may incorporate only one or a plurality of the above-disclosed aspects of the display and may further incorporate only one or a plurality of the above-disclosed features. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, updates, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of outdoor advertising, embodiments of the present disclosure are not limited to use only in this context. For example, the geolocation and time-based advertising are configurable to be used for indoor advertising as well.

Further still, the term 'signage' is used throughout the present specification as a general reference to an advertising medium. Although a signage may be described in various embodiments, it should be understood that any advertising medium may be similarly applicable and considered to be within the scope of the present disclosure. Other advertising media may include, by way of non-limiting example, billboards, TV, real estate and other static, traditional, virtual, 3D, holographic. and digital signage platforms.

Still consistent with embodiments of the present disclosure, advertising content may be provided based on at least one of, or both, geolocation and time data. Although some embodiments of the present disclosure are described with respect to geolocation-based advertising, such embodiments may be contemplated to apply to time-based advertising and are, therefore, considered to be within the scope of the present disclosure.

I. Platform Overview

Consistent with embodiments of the present disclosure, an online platform for geolocation and time-based advertising (also referred to herein as "platform") may be provided. This overview is provided to introduce a selection of concepts in a simplified form that are further described below. This overview is not intended to identify key features or essential features of the claimed subject matter. Nor is this overview intended to be used to limit the claimed subject matter's scope. The online platform may be used by individuals or companies to provide geolocation and time-based advertisements associated with real and/or virtual signage to mobile users and also track user interaction with the geolocation and time-based advertisements.

The online platform for geolocation and time-based advertisements enables an advertising company and others to manage all traditional or digital signage from a single user interface. A virtual signage works much like a traditional or digital signage in that a user can see an advertisement when the user is physically located near a geolocation associated with the virtual signage. Accordingly, the online platform may broadcast the advertisement to the user when the user is a vicinity of the traditional or digital signage.

As an example, users who drive by a geolocation may be "beaconed" or provided with promotional content through, for example, a mobile device application. In an instance, a beacon (i.e., a radio transmitter) may be installed at a traditional or digital signage and/or a location corresponding to a virtual signage. In other embodiments, a modem may be installed and configured to the signage to enable telecommunications between devices and the signage. The content may include, in some instances, a live feed transmission. Further still, the content may include contact point information of a person or entity associated with the content. In some instances, signage with beacon technology may be considered as "Smart Billboards" or "Active Boards" with geolocation and time-based interactive functionality. As will be described in greater detail below, other advertising platforms, such as TVs, may be "Smart TVs" with geolocation and time-based interactivity functions.

Beacons are small devices which can transmit a signal therefore 'searching' for a Bluetooth-enabled device like a smartphone. They are low-cost and require little energy, with transmitters that are equipped with Bluetooth Low Energy (BLE). They're becoming a hot topic within digital signage as the Beacon transmitters can determine how close a device is (such as a smartphone in a shopper's pocket) and transmit a specific signal as a result. This signal may trigger an app on the device, therefore drawing attention to the physical business or location that the beacon is housed in. It should be understood that content may be transmitted from a signage to any type of computing device capable of providing the content to its corresponding user. Thus, although some embodiments disclose mobile computing devices, such as smartphones, many other computing devices may apply, including, but not limited to, in-car entertainment systems.

Accordingly, as a user drives by the traditional or digital signage and/or the location associated with the virtual signage, a mobile device of the user gets beaconed with promotional content. Alternatively, the mobile device of the user may determine a geolocation of the mobile device and transmit the geolocation to the online platform. Subsequently, the online platform may transmit the promotional content to the mobile device.

The promotional content may include a website, a phone, an email address, a video, live feeds, an expiration date, a QR code and a URL for tracking users and interacting with users, as well as additional information about the advertiser. In addition, the content may include connect point information. The connect point information may include, for example, an owner of the signage or a representative of the owner. The URL may include a unique identifier associated with traditional or digital signage.

Accordingly, when the user clicks the URL, the online platform may cross reference the user. In other words, the online platform may detect consumption of the advertisement by the user and consequently generate advertisement statistics corresponding to large number of users. Further, the online platform may also transmit a cookie to the mobile device to track the user for marketing purposes and online behavioral advertising. As a result, the advertisement statistics and/or analytics may indicate number of users who drove by a signage; number of users who clicked the URL that was sent to their mobile device when they drove by the signage; number of users who shared the advertisement and so on. Further, webpage corresponding to the URL may include tracking data that enables the advertising company to collect demographic information of the users who viewed the signage.

Further, the online platform may also allow advertising companies to purchase or rent a physical signage and/or a virtual signage. Accordingly, the online platform may provide a user interface for making payments. Further, the online platform may allow the advertising companies to manage payment schedules, including for example, automatic renewal of rent or lease.

Furthermore, the online platform may integrate with existing advertisement networks (e.g., Google™ Ad Network), mapping applications (e.g., Google Maps™), in-vehicle communication systems (e.g., Apple™ Carplay™) and navigation systems (e.g., TomTom™) in order to deliver advertisements while users drive by real and/or virtual signage.

Additionally, the online platform may facilitate a pin drop feature, according to which, when a user is driving by a location, the user may perform a pin drop action. Consequently, all advertisements from traditional or digital signage in the vicinity of the location may be automatically received and saved in the mobile device of the user. Accordingly, the user may view the advertisements, or reload the advertisement, later on. Such commands may be performed using voice command technology associated with the mobile device, enabled with a plurality of voice commands.

Figure 9:
FIG. 9 illustrates a screenshot 900 of a GUI for adding one or more traditional or digital signage to an online platform for geolocation and time-based advertisements, in accordance with some embodiments.
Figure 11:
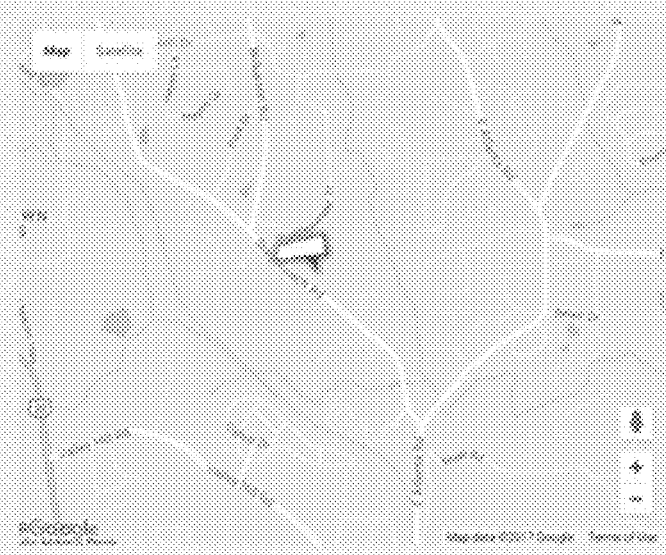
FIG. 11 illustrates a screenshot 1100 of a GUI for receiving a first geolocation corresponding to traditional or digital signage, in accordance with some embodiments.
Figure 12:
FIG. 12 illustrates a screenshot 1200 of a GUI for receiving advertisement content corresponding to traditional or digital signage, in accordance with some embodiments.

The online platform provides a GUI to enable an advertising company to add traditional or digital signage, exemplarily illustrated in FIG. 9. Further, the GUI, as exemplarily illustrated in FIG. 10, may enable the advertising company to provide information associated with the advertising company, such as, for example, a name of the advertising company, a category of an advertisement content, a name of the traditional or digital signage, notes and a description etc. Additionally, the GUI may enable the advertising company to define an advertising content associated with the traditional or digital signage. Further, the GUI, as exemplarily illustrated in FIG. 11, may allow the advertising company to define a geographic location of the traditional or digital signage. In some embodiments, geofencing may be enabled by the area or set of coordinates selected by the user. In some instances, the geographic location does not need to correspond to a physical board and can be a purely digital signage (i.e., virtual signage). Further, the GUI, as illustrated in FIG. 12, may also enable selection of a signage image that gets sent to mobile devices of users when they pass by the traditional or digital signage and/or a location of the virtual signage. Additionally, the GUI may also enable the advertising company to define a radius. Accordingly, only those users whose distance from the geographical location is lesser than or equal to the radius would receive the advertising content.

Figure 14:
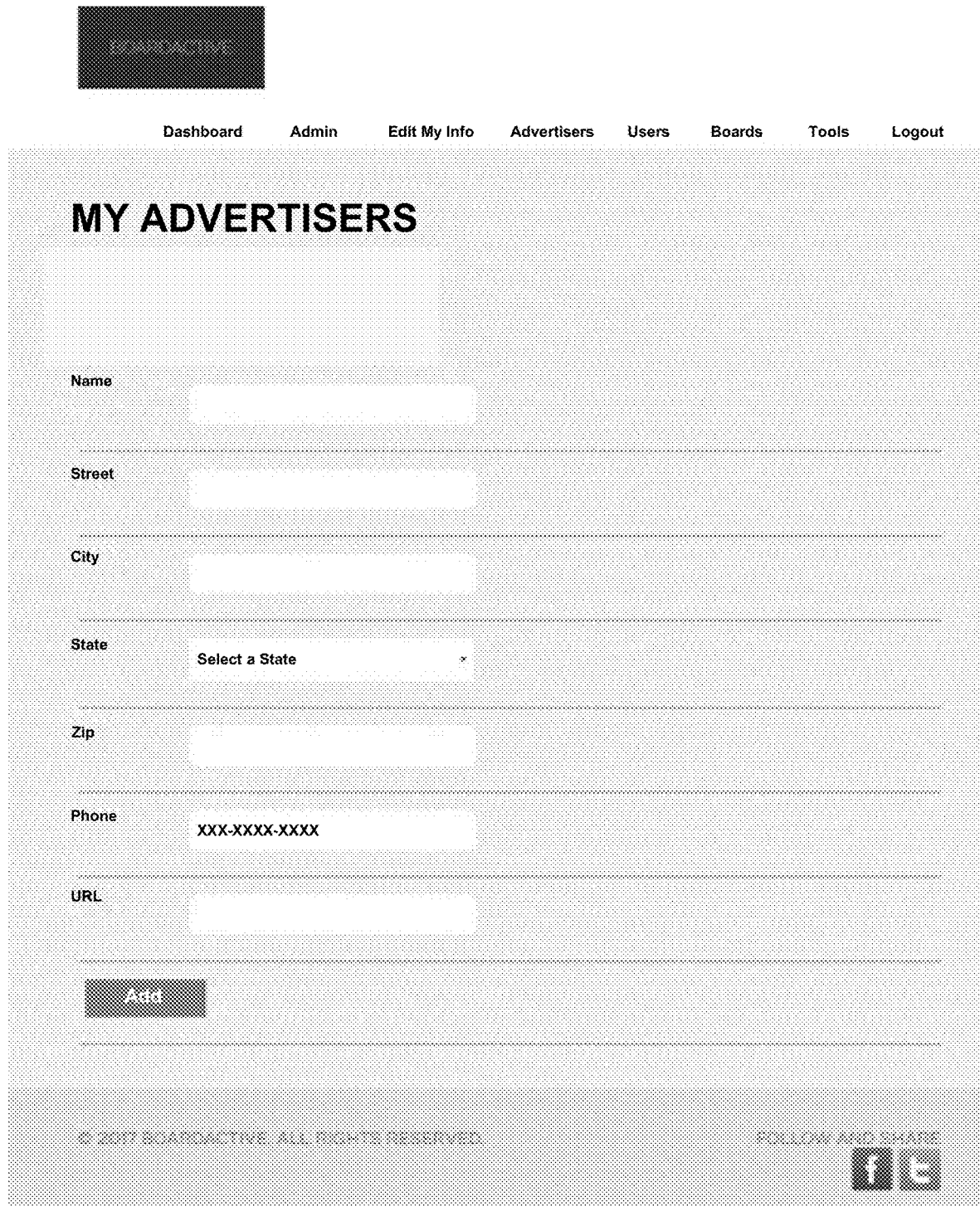
FIG. 14 illustrates a screenshot 1400 of a GUI for receiving information corresponding to an advertiser to be added on the online platform, in accordance with some embodiments.

Further, the online platform may allow a platform manager to add, delete or modify user accounts corresponding to advertising companies through the GUI, as exemplarily illustrated in FIG. 13. Accordingly, the GUI, as exemplarily illustrated in FIG. 14 may enable the platform manager to enter details corresponding to an advertising company to be added to the online platform. Consequently, an advertising company may become a user of the online platform for managing and/or delivering associated geolocation and time-based advertisements.

Further, in order to facilitate delivery of advertisement content to users, the online platform may provide a software application ("app") installable on the mobile device associated with a user. The mobile devices may include, for example, smartphones, in-vehicle communication systems, navigation systems, and digital signage, and other formats. For instance, the app may be made available for download at an app store or online.

Figure 16:
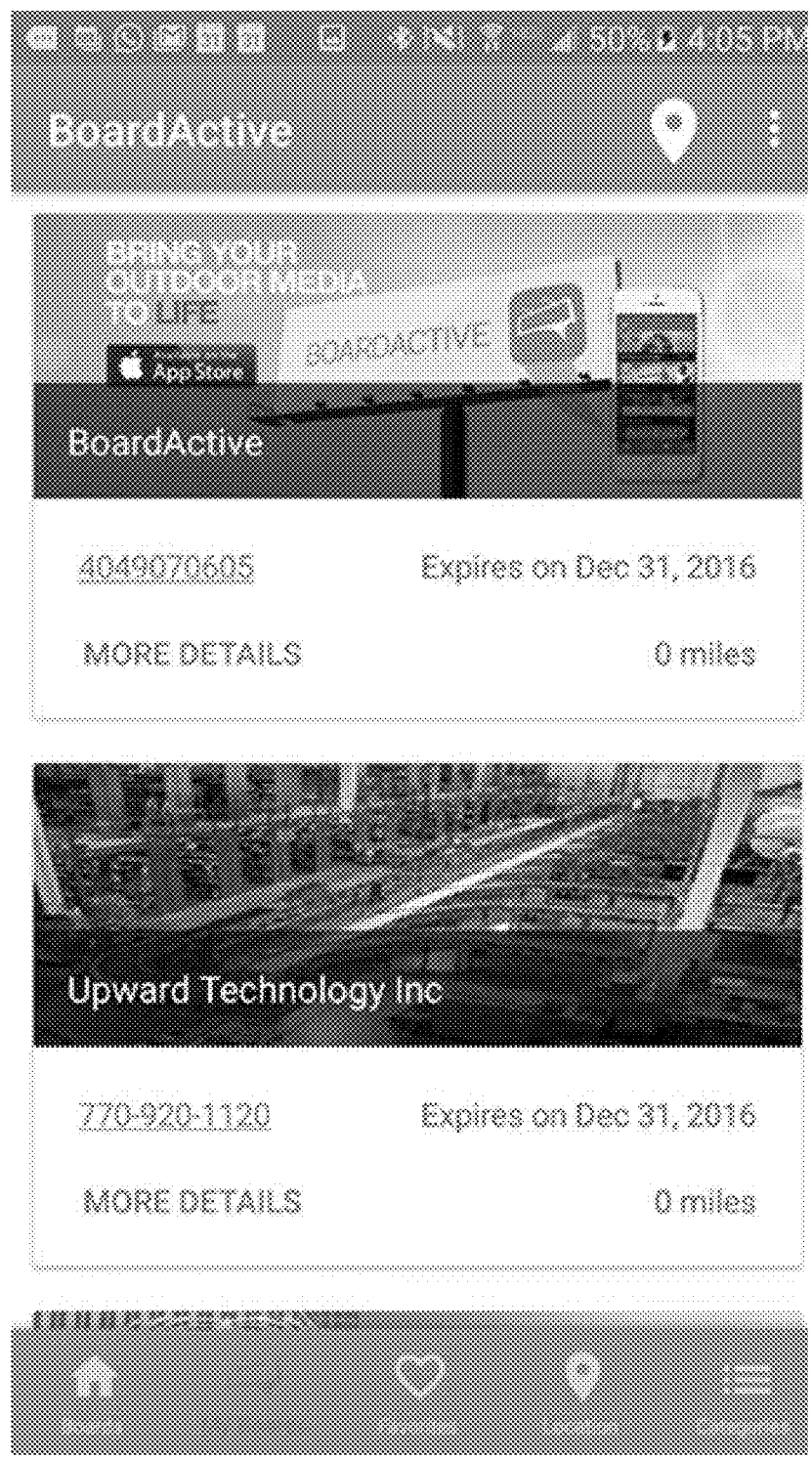
FIG. 16 illustrates a screenshot 1600 of a mobile app for delivering geolocation and time-based advertisements, depicting advertisement content corresponding to one or more traditional or digital signage saved by a user, in accordance with some embodiments.
Figure 17:
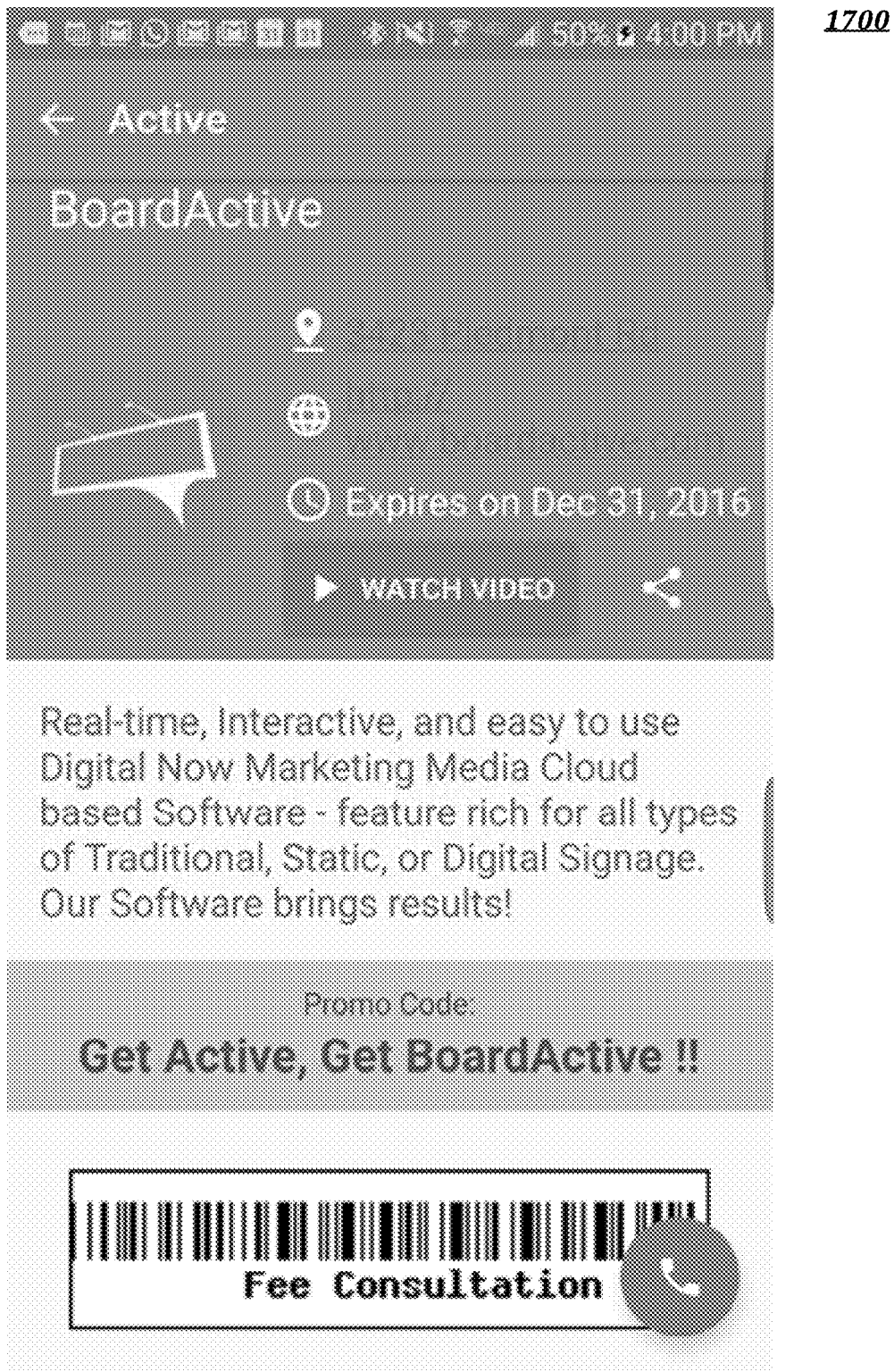
FIG. 17 illustrates a screenshot 1700 of a mobile app for delivering geolocation and time-based advertisements, depicting advertisement content corresponding to traditional or digital signage, in accordance with some embodiments.

The app may be configured to monitor geolocation of the mobile device, using for example, a built-in GPS receiver in the mobile device. Further, the app may be configured to transmit the geolocation to the online platform through a wireless communication network, such as, cellular network. Accordingly, the online platform may be configured to identify and retrieve advertisement content associated with real and/or virtual signage corresponding to the geolocation transmitted by the mobile device. Subsequently, the online platform may transmit the advertisement content to the mobile device to be displayed on the mobile device, as exemplarily illustrated in FIG. 17. Further, the app or beacon may be configured to store all such advertisement content received from the online platform in a local storage unit on the mobile device. Accordingly, the app may enable a user to view all traditional or digital signage that the user has passed by (e.g., walk, ride, or drive), as exemplarily illustrated in FIG. 16.

Figure 15:
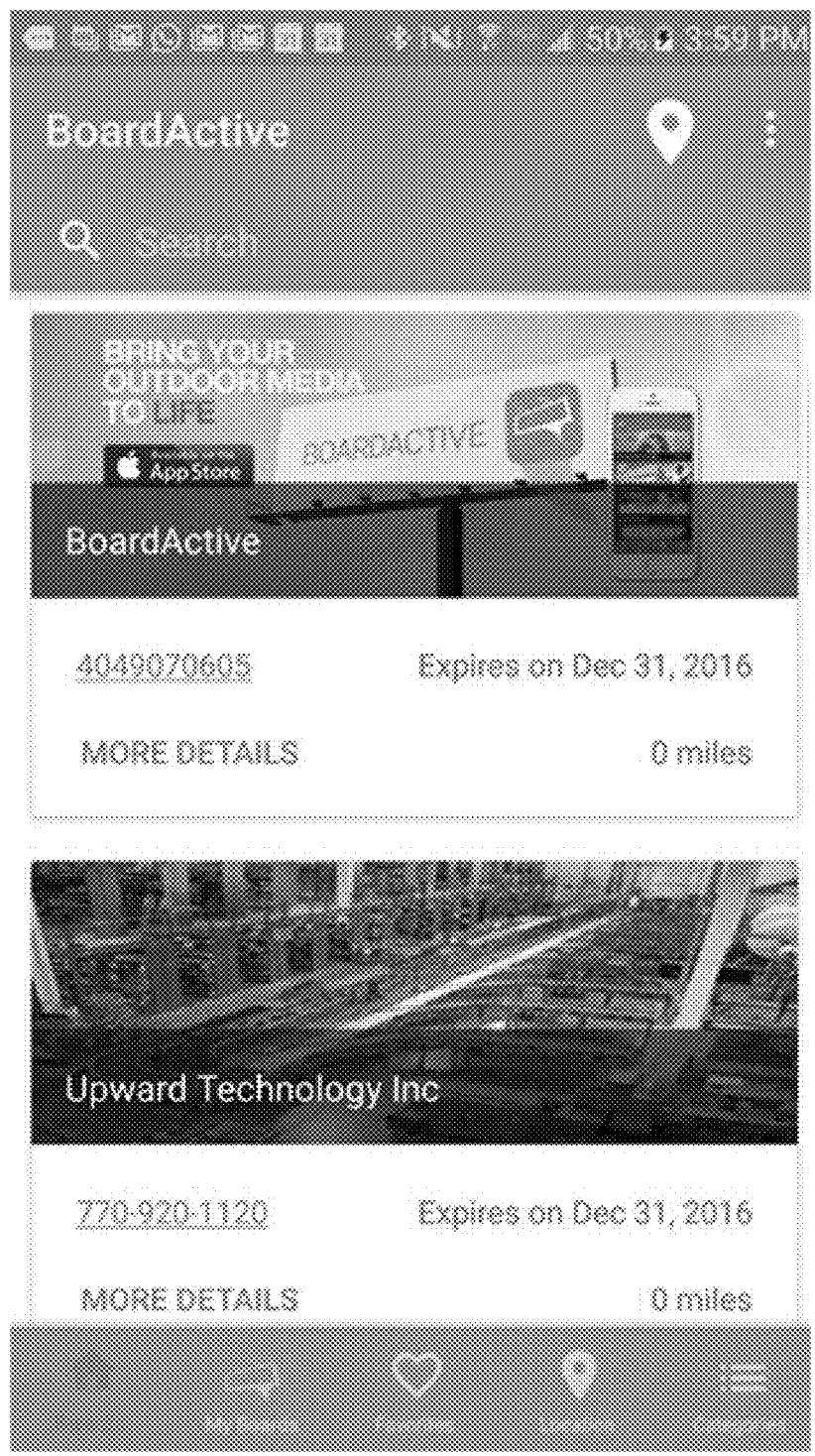
FIG. 15 illustrates a screenshot 1500 of a mobile app for delivering geolocation and time-based advertisements, depicting advertisement content corresponding to one or more traditional or digital signage passed by a user, in accordance with some embodiments.

Additionally, when an advertisement content is displayed to the user while the user is in proximity to traditional or digital signage, the app may also enable a user to save the advertisement content. Accordingly, the user may retrieve a saved advertisement content and view later, as exemplarily illustrated in FIG. 15.

Figure 18:
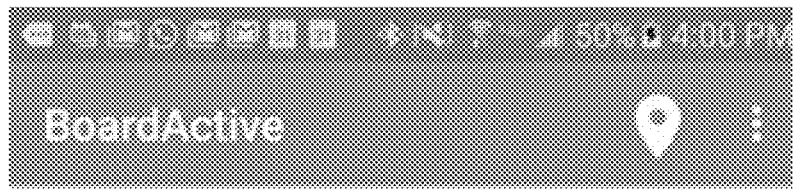
FIG. 18 illustrates a screenshot 1800 of a mobile app for delivering geolocation and time-based advertisements, depicting a plurality of categories associated with advertisement content corresponding to a plurality of traditional or digital signage, in accordance with some embodiments.
Figure 18:
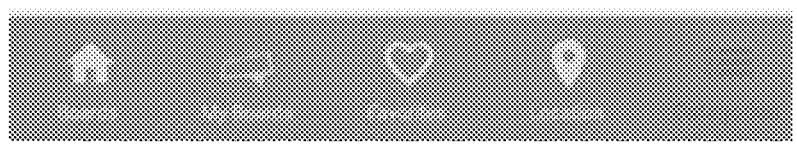

Additionally, the app may be configured to maintain a category associated with advertisement contents. As a result, the app may be able to sort the saved advertisement contents based on a category, provided by the user as exemplarily illustrated in FIG. 18.

Figure 19:
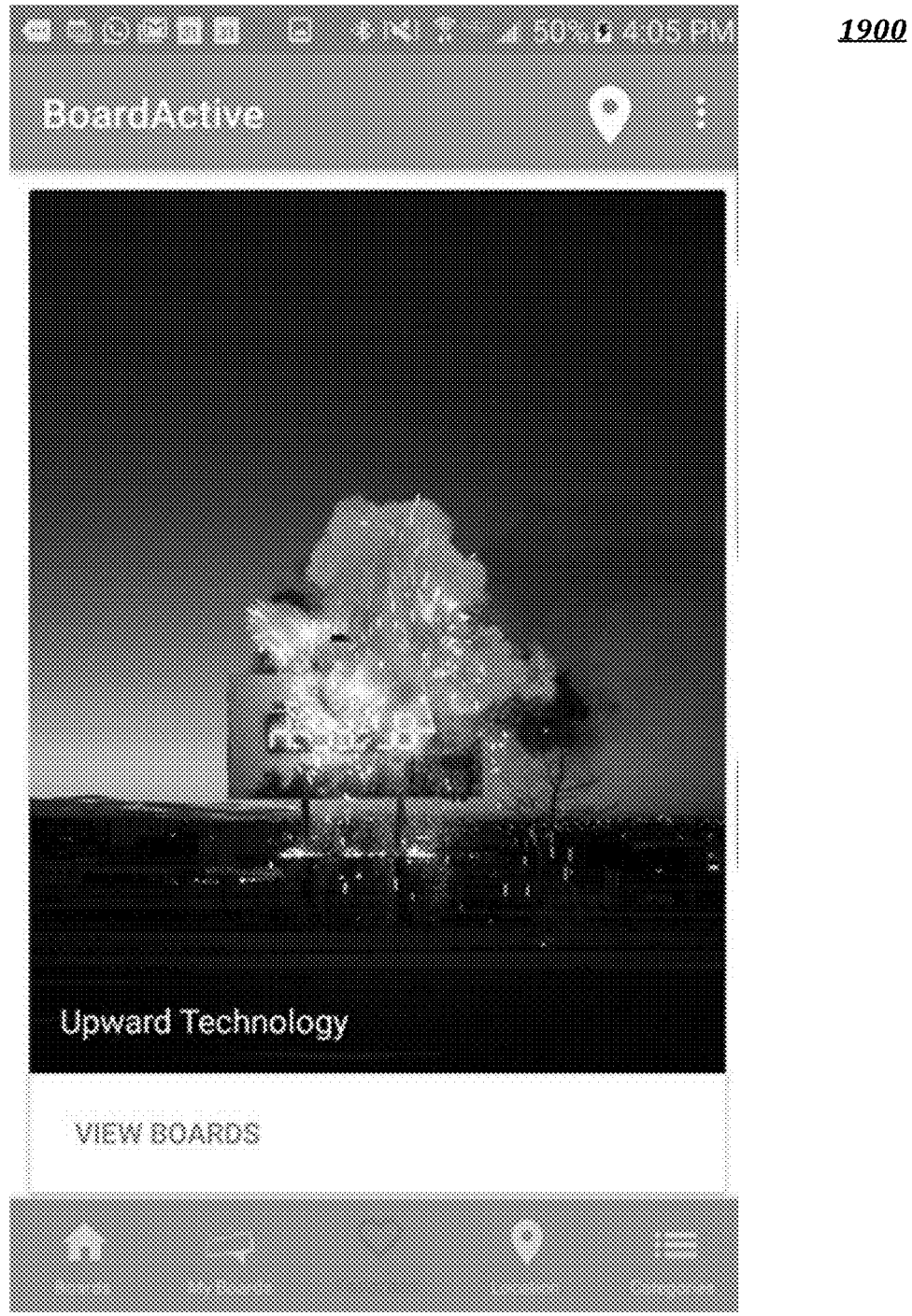
FIG. 19 illustrates a screenshot 1900 of a mobile app for delivering geolocation and time-based advertisements, depicting a user interface for selecting advertisement content corresponding to traditional or digital signage as a favorite, in accordance with some embodiments.

Additionally, the app may be configured to enable the user to perform actions such as "Mark," "Favorite," "Save," and "Share" with regard to an advertisement content displayed on the mobile device, as exemplarily illustrated in FIG. 19. In this way, embodiments of the present disclosure may provide for a "tap and save" media to the consumer, and a "tap and spend" media to the advertiser. Such commands may be performed using voice command technology associated with the mobile device, enabled with a plurality of voice commands.

Further, the app may also be configured to provide the pin drop feature. Accordingly, when the user is at a location, the app may enable the user to drop a pin by touching a Pin Button on the app's GUI. Accordingly, the app may store the location on the local storage device. Subsequently, the user may select the location and view traditional or digital signage in the vicinity of the location, as exemplarily illustrated in FIG. 20. Embodiments of the present disclosure may apply to all forms of digital signage platforms, not just real and/or virtual signage.

Digital signage may be comprised of many different technological components. Any form of display (screens, tablets, kiosks, projectors, signage) that shows information may be configured as a digital signage.

Still consistent with embodiments of the present disclosure, time-based advertisements may be provided in particular geographical segments. The provision of the time-based advertisements may correspond to telecommunications and television networks (collectively referred to herein as 'tele-broadcast'). A viewer within the geographical segment of a tele-broadcast may be exposed to a plurality of advertisements during the streaming of a program. Such advertisements may be broadcasted to the viewer by an entity associated with the corresponding geographical segment.

Embodiments of the present disclosure may enable a platform user to select at least one geographical segment and at least one time at which promotional content associated with the platform user may be tele-broadcasted. The platform may then provide the promotional content and the specified at least one tele-broadcast time for broadcasting the promotional content to an entity or entities corresponding to the specified at least one geographical segment. In turn, a viewer within the geographical segment, at the specified time, may be provided with the promotional content not only via the tele-broadcast, but also through a software application associated with the platform.

In some embodiments, a viewer may have a Smart TV and/or a Digital TV connected to a local area network (LAN). In such scenarios, the software application running on a computing device on the same LAN may be enabled to determine that the viewer has been displayed the promotional content, within the geographical segment and the specified time. In turn, the software application may provide the promotional content via the software application in accordance to the embodiments disclosed herein.

II. Platform Configuration

FIG. 1 is an illustration of a platform consistent with various embodiments of the present disclosure. By way of non-limiting example, the online platform 100 for geolocation and time-based advertisements may be hosted on a centralized server 110, such as, for example, a cloud computing service. The centralized server may communicate with other network entities, such as, for example, a signage equipped with wireless communication means, a mobile device (such as a smartphone, tablet, a laptop, or wireless computing devices etc.) and a client device (such as a desktop, laptop, smartphone etc.). A user 105, such as a manager of the online platform 100 and/or an administrator of an advertising company may access platform 100 through a software application. The software application may be embodied as, for example, but not be limited to, a website, a web application, a desktop application, and a mobile application compatible with a computing device 2100. One possible embodiment of the software application may be provided by BoardActive Suite of products and services. Accordingly, the user 105 may provide, for example, advertisement content and one or more geographical locations corresponding to traditional or digital signage. In response, the platform may associate the advertisement content with the one or more geographical locations and accordingly deliver the advertisement content to mobile devices in the vicinity of the one or more geographical locations.

As will be detailed with reference to FIG. 21 below, the computing device through which the platform may be accessed may comprise, but not be limited to, for example, a desktop computer, laptop, a tablet, or mobile telecommunications device. As will be detailed with reference to FIG. 21 below, the computing device through which the platform may be accessed may comprise, but not be limited to, for example, Smart TV, a desktop computer, laptop, a tablet, or mobile telecommunications device. Though the present disclosure is written with reference to a mobile telecommunications device, digital signage, and TVs, it should be understood that any computing device may be employed to provide the various embodiments disclosed herein.

Figure 2:
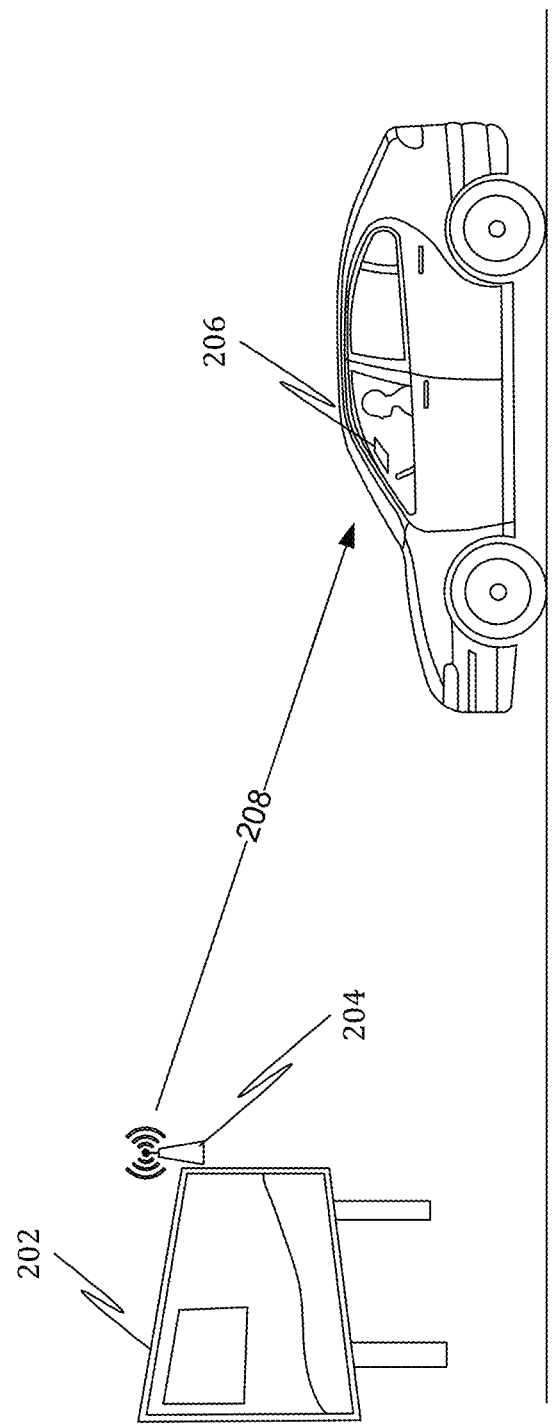
FIG. 2 illustrates delivering advertisement content associated with traditional or digital signage to a mobile device of a user by communicating with a beacon, in accordance with some embodiments.

Referring now to FIG. 2, delivering advertisement content associated with traditional or digital signage to a mobile device of a user by communicating with a beacon, in accordance with some embodiments is illustrated. As shown, in an instance, a traditional or digital signage 202 may be installed at a first geolocation. The location may not be limited to a billboard along a road as illustrated. Rather, the location may include, but not limited to, for example, a sporting event or an airport. Further, the traditional or digital signage may be equipped with a beacon 204 configured to transmit wireless signals 208 containing the advertisement content. As a mobile device 206 approaches the traditional or digital signage 202, the mobile device may be configured to receive the wireless signals 208. For example, a mobile app installed on the mobile device may regularly monitor for presence of wireless signals 208. Accordingly, when the mobile device 206 is within the transmission range of the beacon 204, the mobile app may decode the wireless signals 208 and display the advertisement content on the mobile device 206. The mobile device 206 may be operated by a user travelling by the traditional or digital signage, such as for example, in a vehicle. Although many embodiments are described herein with reference to a vehicle, any use in proximate location of the signage, whether or not in a vehicle, may be operative with the embodiments disclosed herein.

Although FIG. 2 depicts a traditional or digital signage at the first geographical location, in view of the present disclosure, it may be understood that in some embodiments, the traditional or digital signage may be empty or completely absent. In some embodiments, a virtual signage may be used. A virtual signage may be displayed to the user by, for example, but not limited to, augmented reality digital image processing techniques, or virtual reality environments. The user need not be aware of the presence of the virtual signage in their geolocation for embodiments to enable the provision of the advertisement associated with the virtual signage. Thus, by placing the beacon 204 at the first geolocation, the same end result of displaying advertisement content on the mobile device 206 in the vicinity of the first geolocation may be achieved.

Figure 3:
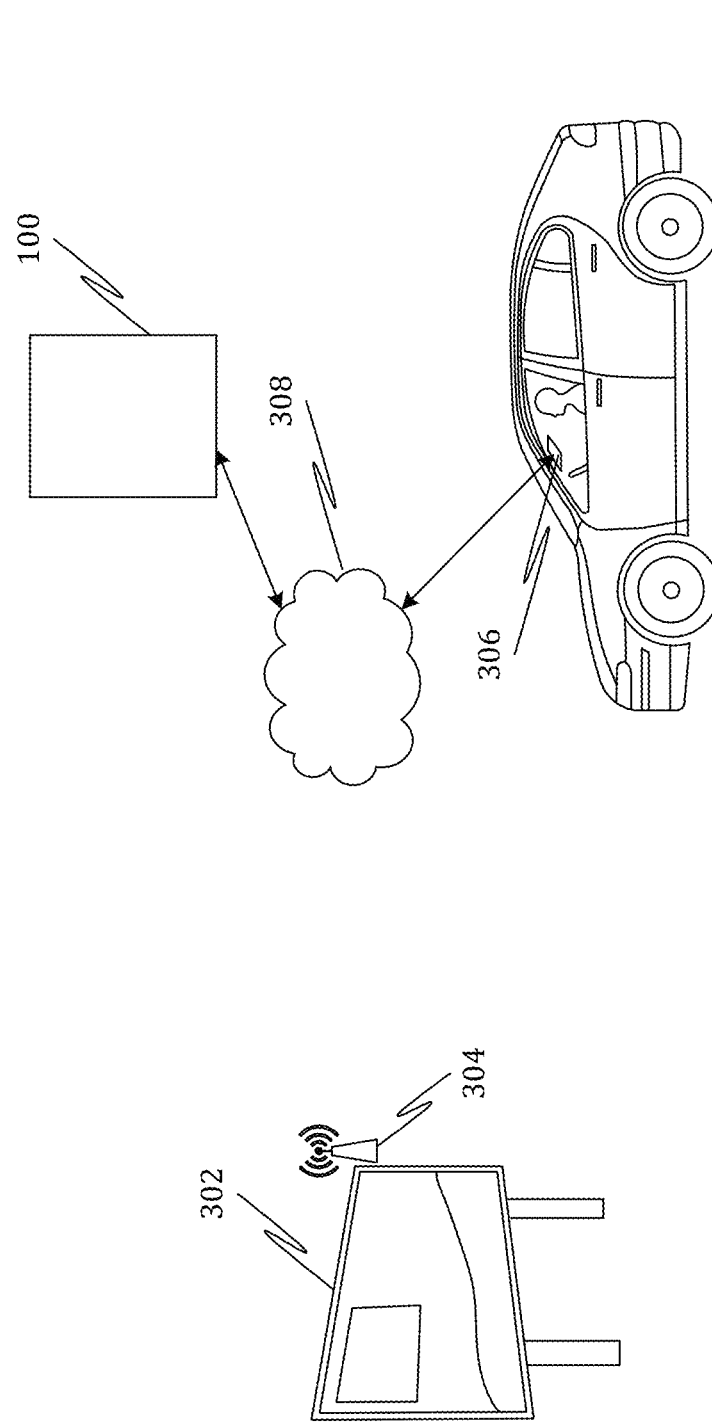
FIG. 3 illustrates delivering advertisement content associated with traditional or digital signage to a mobile device of a user by communicating with an online platform, in accordance with some embodiments.

FIG. 3 illustrates delivering advertisement content associated with traditional or digital signage to a mobile device of a user by communicating with an online platform 100, in accordance with some embodiments. It should be noted that, with some embodiments, the provision of the advertisement and the interactivity with digital signage may be with a computing device built into the user's vehicle. As shown, a traditional or digital signage 302 may be physically installed at a first geolocation. Additionally, the traditional or digital signage 302 may be equipped with a beacon 304 configured to transmit wireless signals 208 containing the advertisement content. Further, a mobile device 306 may be configured to regularly monitor a location of the mobile device. For example, a mobile app installed on the mobile device 306 may periodically query a GPS receiver on the mobile device to determine a current location of the mobile device. Further, the mobile app may be configured to regularly transmit the location of the mobile device to the online platform 100 over a communication channel 308, such as for example, wireless cellular network and/or the Internet.

Accordingly, in an instance, as the mobile device 306 approaches the traditional or digital signage 302, the mobile device may be configured to receive the wireless signals transmitted by the beacon 304. Alternatively, and/or additionally, the mobile device 306 may also receive advertisement content from the online platform upon approaching the vicinity of the traditional or digital signage. Accordingly, in an instance, advertisement content received from the beacon 304 may be augmented with advertisement content received from the online platform.

Although FIG. 3 depicts a traditional or digital signage at the first geographical location, in view of the present disclosure, it may be understood that in some embodiments, the traditional or digital signage may be empty or completely absent. Further, in an instance, even if the beacon 304 is absent at the first geolocation, the same end result of displaying the advertisement content on the mobile device 306 in the vicinity of the first geolocation may be achieved.

Figure 4:
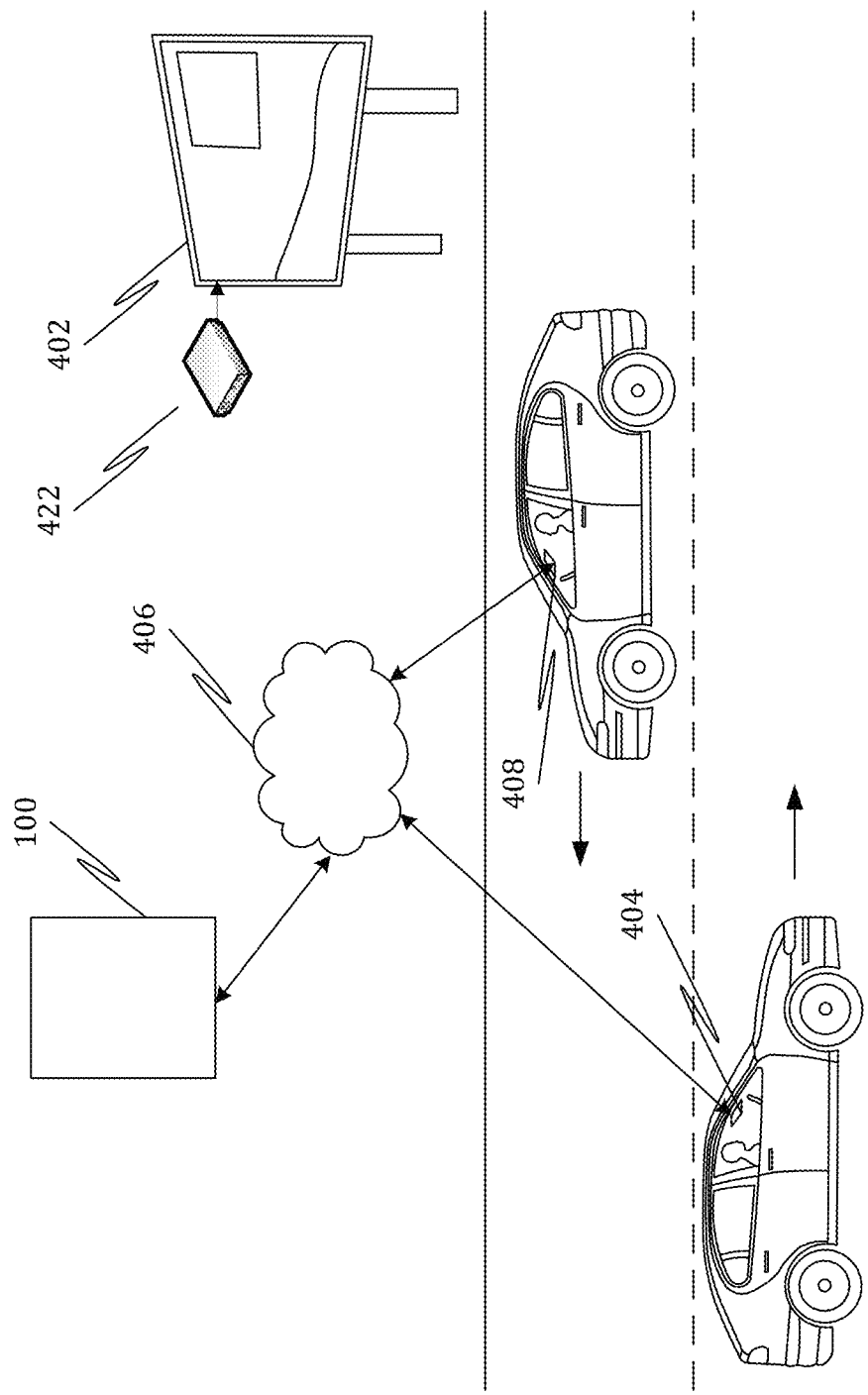
FIG. 4 illustrates delivering advertisement content associated with traditional or digital signage to a mobile device of a user based on a relative direction of the user's movement, in accordance with some embodiments.

FIG. 4 illustrates delivering advertisement content associated with traditional or digital signage to a mobile device of a user based on a relative direction of the user's movement, in accordance with some embodiments. As illustrated, a traditional or digital signage 402 may be installed at a first geolocation. Digital signage 402 may comprise an attachable modem 422 so as to enable signage to interface with a telecommunications network. The telecommunications network, in turn, may be in operative communication with mobile device 404.

Further, the traditional or digital signage 402 may be installed on one side of a highway such that, the traditional or digital signage 402 is visible only to users travelling on the corresponding side of highway towards a face of the traditional or digital signage 402. As a result, a mobile device 404 carried by a user travelling towards the face of the traditional or digital signage 402 may be able to receive the advertisement content corresponding to the traditional or digital signage 402. In order to achieve this, a direction of travel of the mobile device 404 in relation to the first geolocation location may be determined. The direction of travel may be determined, for example, using data received from GPS receiver on the mobile device 404 in conjunction with map information. Accordingly, a mobile app on the mobile device 404 may transmit direction of motion information to the online platform 100 through a communication channel 406 such as, for example, wireless cellular network and/or the Internet. Further, based on the direction of motion information received, the online platform 100 may determine that the traditional or digital signage 402 is intended to be visible for a user of the mobile device 404. Consequently, the online platform may deliver the advertisement content to the mobile device 404.

However, users travelling on the other side of the highway away from the face of the traditional or digital signage 402 may not be able to view the traditional or digital signage 402. Accordingly, for example, a mobile device 408 operated by a user travelling away from the face of the traditional or digital signage 402 may not receive the advertisement content. Accordingly, a mobile app on the mobile device 408 may transmit direction of motion information to the online platform 100 through the communication channel 406. Further, based on the direction of motion information received, the online platform 100 may determine that the traditional or digital signage 402 is not intended to be visible for a user of the mobile device 408. Consequently, the online platform may not deliver the advertisement content to the mobile device 408.

As a result, advertisement content may be delivered to users only if they are relevant. In some embodiments it can be foreseen that, for example, the advertisement content may not be relevant for users traveling away from the face of a signage since the signage may be advertising a facility that is situated ahead of the location of the signage. As a result, users who are travelling in an opposite direction may not able to visit the facility and avail of an offer advertised on the signage. Still consistent with embodiments, advertisement content may be provided based on, for example, demographic information associated with the consumer receiving the content. In this way, the content may be tailored by, for example, category, to the user.

III. Platform Operation

Although methods 500 to 800 have been described to be performed by platform 100, it should be understood that computing device 2100 may be used to perform the various stages of methods 500 to 800. Furthermore, in some embodiments, different operations may be performed by different networked elements in operative communication with computing device 2100. For example, server 110 may be employed in the performance of some or all of the stages in methods 500 to 800. Moreover, server 110 may be configured much like computing device 2100.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 500 to 800 will be described in greater detail below.

Figure 5:
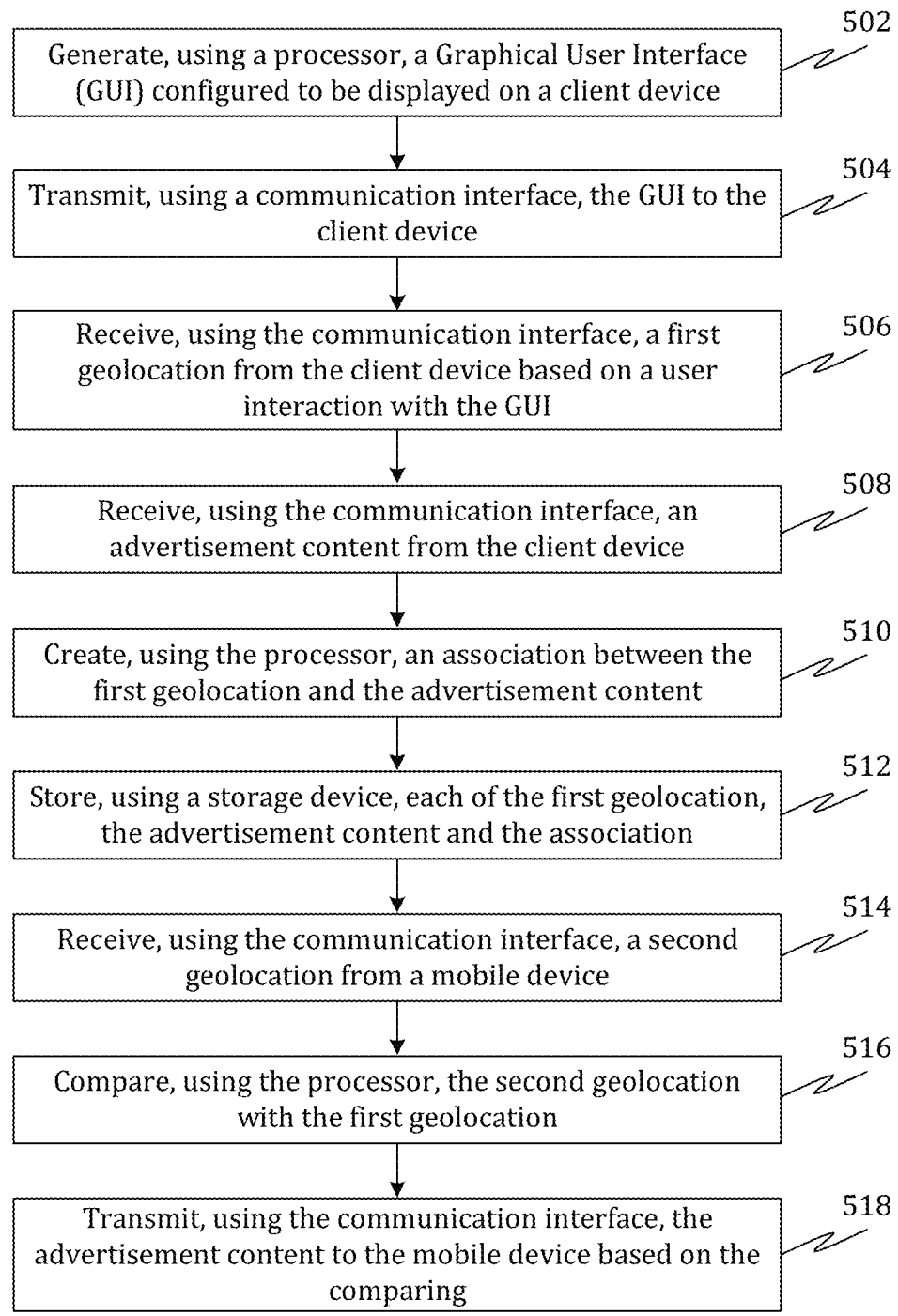
FIG. 5 illustrates a flowchart of a method 500 of geolocation and time-based advertisements, in accordance with some embodiments.

FIG. 5 illustrates a flowchart of a method 500 of geolocation and time-based advertisements, in accordance with some embodiments. The method 500 may include a step 502 of generating, using a processor, a Graphical User Interface (GUI) configured to be displayed on a client device. Additionally, the method 500 may include a step 504 of transmitting, using a communication interface, the GUI to the client device. Further, the method 500 may include a step 506 of receiving, using the communication interface, a first geolocation from the client device based on a user interaction with the GUI. In some embodiments, the first geolocation may be associated with at least one of a traditional or digital signage and a virtual signage. Furthermore, the method 500 may include a step 508 of receiving, using the communication interface, an advertisement content from the client device. Additionally, the method 500 may include a step 510 of creating, using the processor, an association between the first geolocation and the advertisement content. Further, the method 500 may include a step 512 of storing, using a storage device, each of the first geolocation, the advertisement content and the association. Furthermore, the method 500 may include a step 514 of receiving, using the communication interface, a second geolocation from a mobile device. The mobile device may include one or more of a smartphone, a vehicle navigation system and an in-vehicle communication system. Additionally, the method 500 may include a step 516 of comparing, using the processor, the second geolocation with the first geolocation. Further, the method 500 may include a step 518 of transmitting, using the communication interface, the advertisement content to the mobile device based on the comparing.

Further, in some embodiments, the online platform may be configured for receiving, using the communication interface, a radius from the client device. The radius may define a region centered on the first geolocation. Further, comparing the first geolocation with the second geolocation comprises determining whether the second geolocation falls within the region. As a result, the administrator of an advertising company may control an area surrounding the first geolocation within which users would receive the advertisement content.

In some embodiments, the communication interface may include a long-range communication interface configured to provide communication between the online platform for geolocation and time-based advertising and each of the client device and the mobile device. Alternatively, and/or additionally, in some embodiments, the communication interface may include a short-range communication interface and a long-range communication interface. Further, the long-range communication interface may be configured to provide communication between the online platform for geolocation and time-based advertising and the client device. Furthermore, the short-range communication interface may be configured to provide communication between a beacon and the mobile device. Additionally, the beacon may be located in a vicinity of the first geolocation.

Figure 6:
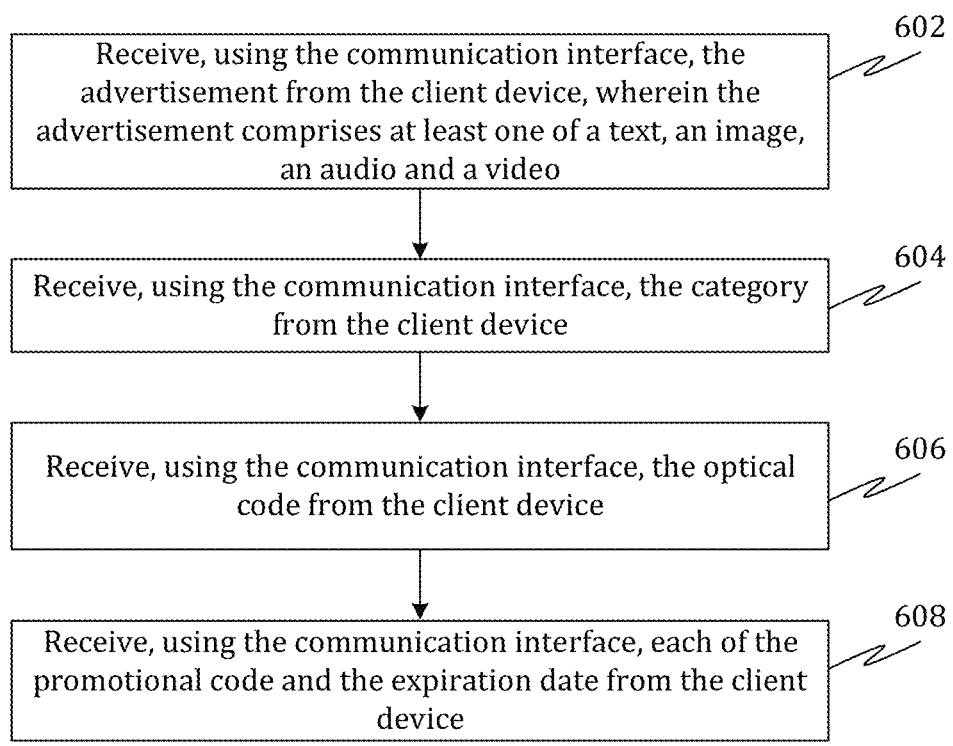
FIG. 6 illustrates a flow chart of a method 600 geolocation and time-based advertisements by receiving advertisement content from a client device, in accordance with some embodiments.

FIG. 6 illustrates a flow chart of a method 600 for geolocation and time-based advertisements by receiving advertisement content from a client device, in accordance with some embodiments. The advertisement content may include each of an advertisement, a category associated with the advertisement, an optical code, a promotional code, an expiration date associated with the promotional code and a URL of a webpage. Accordingly, the method 600 may include a step 602 of receiving, using the communication interface, the advertisement from the client device, wherein the advertisement comprises at least one of a text, an image, an audio and a video. Additionally, the method 600 may include a step 604 of receiving, using the communication interface, the category from the client device. Further, the method 600 may include a step 606 of receiving, using the communication interface, the optical code from the client device. Furthermore, the method 600 may include a step 608 of receiving, using the communication interface, each of the promotional code and the expiration date from the client device. Further, the method 600 may include a step 610 of receiving, using the communication interface, the URL from the client device.

An exemplary GUI for receiving the advertisement content is illustrated in FIG. 12. As shown, the GUI may enable a user, such as an administrator of an advertising company to select a file containing the image (i.e., Signage image) to be associated with the traditional or digital signage. Additionally, the GUI may provide a functionality to perform editing operations on the image, such as, but not limited to, resizing, cropping, filtering etc. Further, the GUI may also enable the administrator to select a logo to be associated with the advertisement content. Furthermore, the GUI may also enable the administrator to enter the expiration date. Moreover, the GUI may also enable the administrator to select a file containing an optical code, such as for example, a barcode or a QR code. Additionally, the GUI may also provide a functionality to create a barcode or a QR code. Additionally, and/or alternatively, the GUI may also enable the administrator to enter a promo code and an Audio/Video link, including, for example, connect point information.

In some embodiments, the category associated with the advertisement content may enable the user to manage the advertisement content in a more effective manner. For example, the user may be able to search, filter or sort advertisement contents from various real and/or virtual signage based on the category. Accordingly, using an input unit of the mobile device, the user may provide the category.

Subsequently, using a display unit of the mobile device, the advertisement associated with the category may be displayed.

Figure 7:
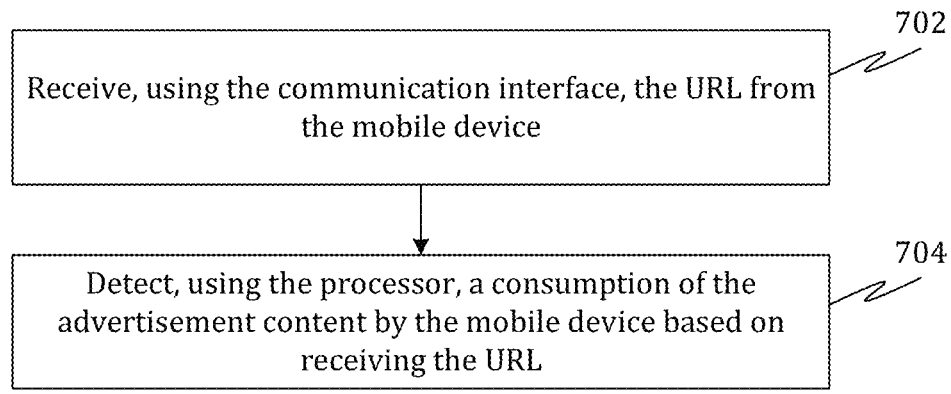
FIG. 7 illustrates a flow chart of a method 700 of detecting consumption of an advertisement content associated with traditional or digital signage, in accordance with some embodiments.

FIG. 7 illustrates a flow chart of a method 700 of detecting consumption of an advertisement content associated with traditional or digital signage, in accordance with some embodiments. In order to facilitate detecting consumption, a URL of a webpage configured for tracking requests is embedded in the advertisement content. Further, the URL is uniquely associated with the first geolocation corresponding to the traditional or digital signage. Accordingly, the method 700 may include a step 702 of receiving, using the communication interface, the URL from the mobile device. For instance, when the advertisement content is displayed on a mobile device of a user, a click operation on the URL by the user may generate a webpage request received by the online platform. Additionally, the method 700 may include a step 704 of detecting, using the processor, a consumption of the advertisement content by the mobile device based on receiving the URL. As an example, receipt of the webpage request from the mobile device is indicative of the fact that the advertisement content was displayed on the mobile device.

Further, in some embodiments, additional tracking of user activity may be performed. For example, subsequent to a click operation on the URL, the online platform may transmit, using the communication interface, a cookie to the mobile device. Further, the cookie may be configured to track user activity on the mobile device. As a result, rich user behavior data may be collected that may provide greater insights into user intent, interest etc. which may facilitate targeted advertising and user analytics.

Further, in some embodiments, based on detecting the consumption of the advertisement, advertisement statistics may be generated using the processor. The advertisement statistics may include one or more of number of views of the advertisement content, number of actions performed on the advertisement content, number of saves performed on the advertisement content, and number of shares performed on the advertisement content. Further, the advertisement statistics may be displayed along with a corresponding real and/or virtual signage, as exemplarily illustrated in FIG. 9. As a result, an advertising company may obtain immediate insights into user interaction with a corresponding real and/or virtual signage.

Figure 8:
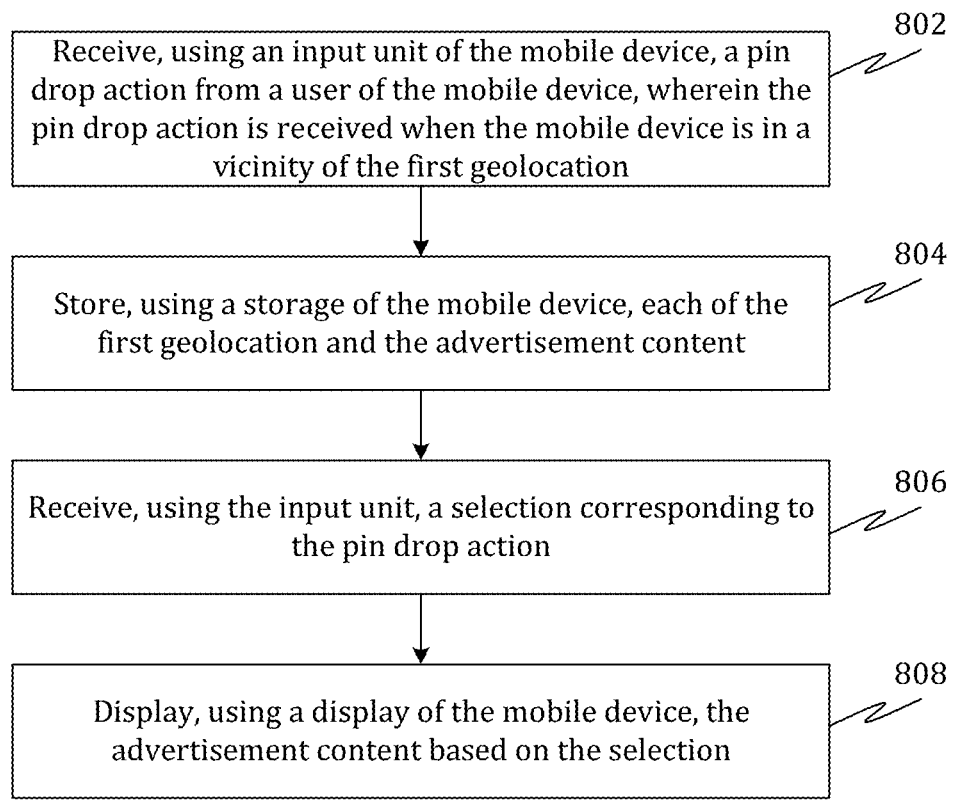
FIG. 8 illustrates a flow chart of a method 800 of providing a pin drop feature for identifying and viewing traditional or digital signage associated with a geographical location on which a pin drop action is performed, in accordance with some embodiments. Such commands may be performed using voice command technology associated with the mobile device, enabled with a plurality of voice commands.

FIG. 8 illustrates a flow chart of a method 800 of providing a pin drop feature for identifying and viewing traditional or digital signage associated with a geographical location on which a pin drop action is performed, in accordance with some embodiments. Accordingly, the method 800 may include a step 802 of receiving, using an input unit of a mobile device, a pin drop action from a user of the mobile device. Throughout the various embodiments disclosure herein, touch, voice, and gesture input may be an input medium compatible with the computing devices used. The pin drop action may be received when the mobile device is in a vicinity of the first geolocation. Further, the method 800 may include a step 804 of storing, using a storage of the mobile device, each of the first geolocation and the advertisement content. Furthermore, the method 800 may include a step 806 of receiving, using the input unit, a selection corresponding to the pin drop action. Additionally, the method 800 may include as step 808 of displaying, using a display of the mobile device, the advertisement content based on the selection.

Figure 20:
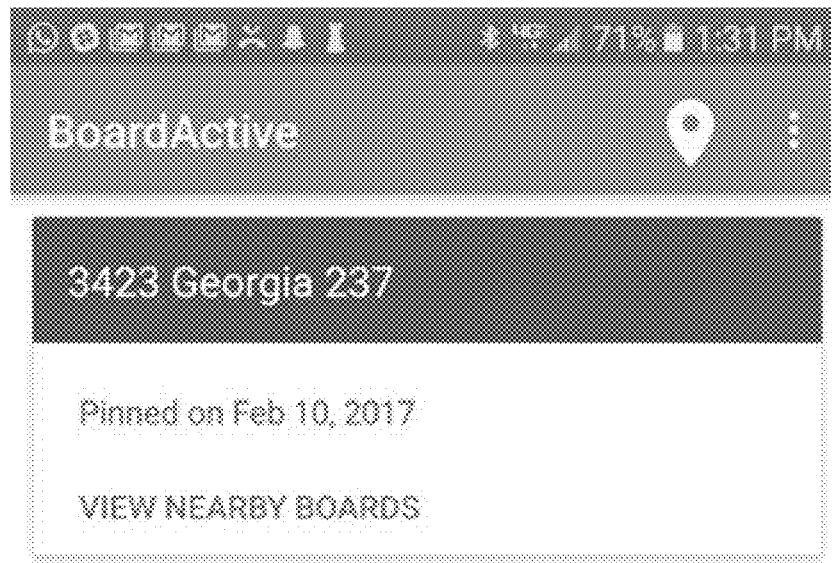
FIG. 20 illustrates a screenshot 2000 of a mobile app for delivering geolocation and time-based advertisements, depicting advertisement content corresponding to one or more traditional or digital signage associated with a pin drop action, in accordance with some embodiments.
Figure 20:
Figure 20:
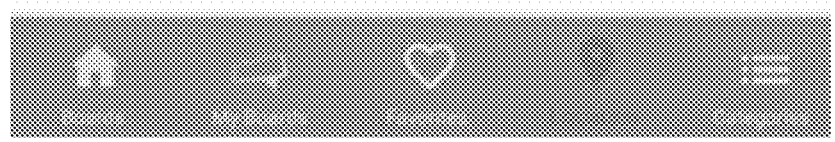

An exemplary illustration of the pin drop feature may be seen in FIG. 20. As illustrated, the screenshot 2000 of the GUI depicts two geographical locations where the user performed a pin drop action. Further, the GUI may also display a time at which the pin drop action was performed. Additionally, corresponding to each pin drop event, an option (i.e., "View Nearby Boards") may be provided for the user to view nearby real and/or virtual signage.

IV. Platform Architecture

The online platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods 500 to 800 have been described to be performed by a computing device 2100, it should be understood that, in some embodiments, different operations may be performed by different networked elements in operative communication with computing device 2100.

Embodiments of the present disclosure may comprise a system having a memory storage and a processing unit. The processing unit coupled to the memory storage, wherein the processing unit is configured to perform the stages of methods 500 to 800.

Figure 21:
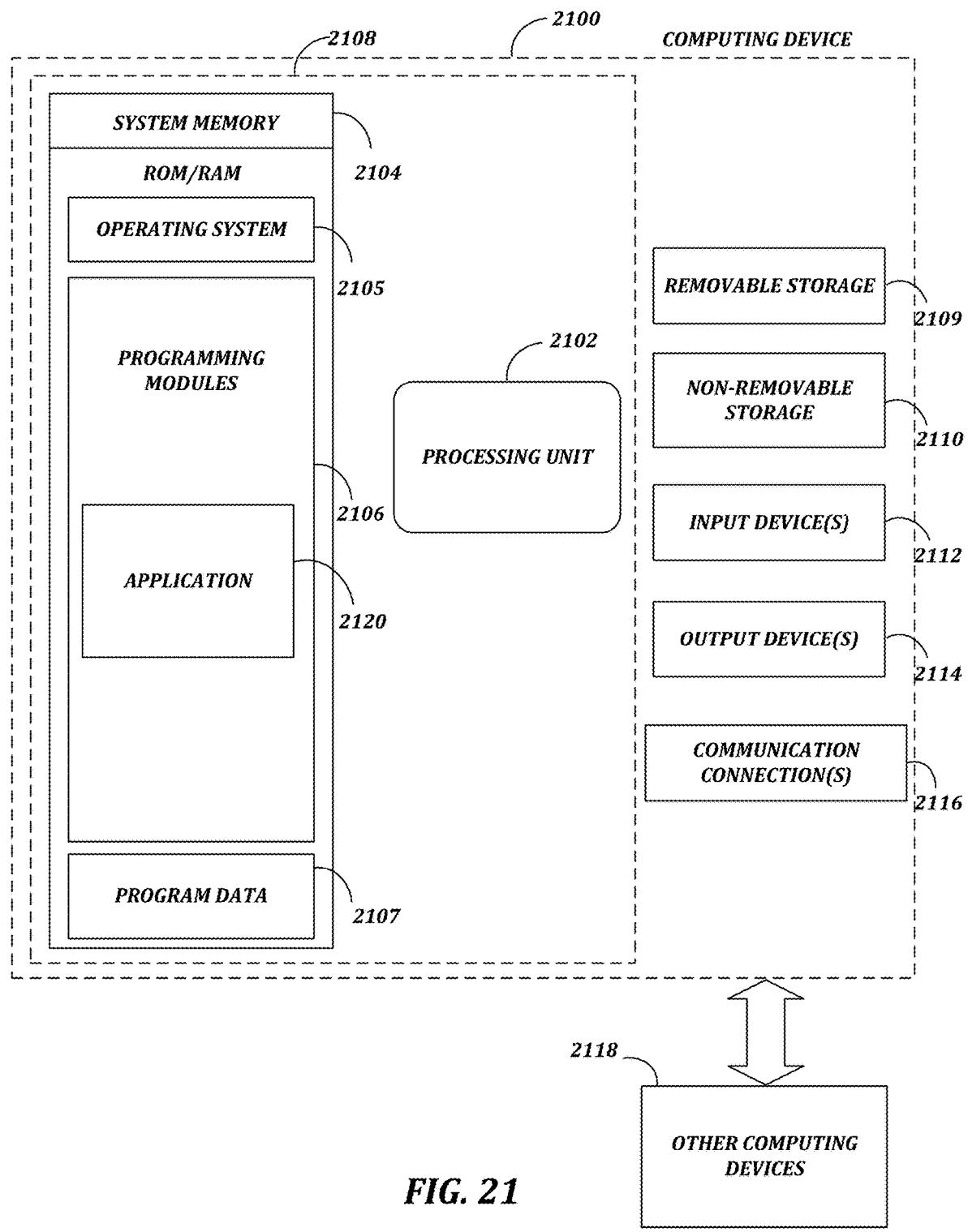
FIG. 21 illustrates a block diagram of a system for implementing the online platform for geolocation and time-based advertising, in accordance with some embodiment.

FIG. 21 is a block diagram of a system including computing device 2100. Consistent with an embodiment of the disclosure, the aforementioned memory storage and processing unit may be implemented in a computing device, such as computing device 2100 of FIG. 21. Any suitable combination of hardware, software, or firmware may be used to implement the memory storage and processing unit. For example, the memory storage and processing unit may be implemented with computing device 2100 or any of other computing devices 2118, in combination with computing device 2100. The aforementioned system, device, and processors are examples and other systems, devices, and processors may comprise the aforementioned memory storage and processing unit, consistent with embodiments of the disclosure.

With reference to FIG. 21, a system consistent with an embodiment of the disclosure may include a computing device or cloud service, such as computing device 2100. Computing device 2100 may reside in the cloud. In a basic configuration, computing device 2100 may include at least one processing unit 2102 and a system memory 2104. Depending on the configuration and type of computing device, system memory 2104 may comprise, but is not limited to, volatile (e.g., random access memory (RAM)), non-volatile (e.g., read-only memory (ROM)), flash memory, or any combination. System memory 2104 may include operating system 2105, one or more programming modules 2106, and may include a program data 2107. Operating system 2105, for example, may be suitable for controlling computing device 2100's operation. In one embodiment, programming modules 2106 may include image encoding module, machine learning module and image classifying module. Furthermore, embodiments of the disclosure may be practiced in conjunction with a graphics library, other operating systems, or any other application program and is not limited to any particular application or system. This basic configuration is illustrated in FIG. 21 by those components within a dashed line 2108.

Computing device 2100 may have additional features or functionality. For example, computing device 2100 may also include additional data storage devices (removable and/or non-removable) such as, for example, magnetic disks, optical disks, or tape. Such additional storage is illustrated in FIG. 21 by a removable storage 2109 and a non-removable storage 2110. Computer storage media may include volatile and nonvolatile, removable and non-removable media implemented in any method or technology for storage of information, such as computer readable instructions, data structures, program modules, or other data. System memory 2104, removable storage 2109, and non-removable storage 2110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2100. Any such computer storage media may be part of computing device 2100. Computing device 2100 may also have input device(s) 2112 such as a keyboard, a mouse, a pen, a sound input device, a touch input device, etc. Output device(s) 2114 such as a display, speakers, a printer, etc. may also be included. The aforementioned devices are examples and others may be used.

Computing device 2100 may also contain a communication connection(s) 2116 that may allow computing device 2100 to communicate with other computing devices 2118, such as over a network in a distributed computing environment, for example, an intranet or the Internet. Communication connection(s) 2116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), RFID, modem, beacon technology, infrared, and other cloud-based wireless media. The term computer readable media as used herein may include both storage media and communication media.

As stated above, a number of program modules and data files may be stored in system memory 2104, including operating system 2105. While executing on processing unit 2102, programming modules 2106 (e.g., application 2120) may perform processes including, for example, stages of one or more of methods 500 to 800 as described above. The aforementioned process is an example, and processing unit 2102 may perform other processes. Other programming modules that may be used in accordance with embodiments of the present disclosure may include image encoding applications, machine learning application, image classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, cloud-computing, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory, which may reside in a cloud.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

The following is claimed:

1. A method of geolocation and time-based content provision, the method comprising:
   associating content with a geolocation, wherein associating the content with the geolocation comprises:
   receiving a specification of the geolocation, the specification including a radius defining a region of the geolocation,
   receiving the content to be associated with the geolocation,
   associating the geolocation with the content,
   storing each of the geolocation, the content, and the association,
   providing an interface configured to display the following:
      the geolocation,
      the content associated with to the geolocation,
      analytics associated with the content and the geolocation, and
      defining a delivery condition for delivering the content, the delivery condition comprising a period of time and a direction of travel during a course of travel of the mobile computing device from a first location to a second location;
   receiving a first indication from the mobile computing device, wherein receiving the first indication comprises receiving the first location of the mobile computing device;
   determining that the first location is within a radius of the geolocation associated with the content;
   tracking the mobile computing device in response to the first indication, wherein tracking the mobile computing device comprises tracking the mobile computing device during the course of travel;
   receiving a second indication from the mobile computing device, wherein receiving the second indication comprises receiving the second location from the mobile computing device during the course of travel;
   comparing the second location with the first location;
   determining the direction of travel of the mobile device during the course of travel from the first location to the second location based on the comparison; and
   transmitting, when the delivery condition is met, the content to the mobile computing device.

2. The method of claim 1, wherein associating the geolocation with the content comprises associating the geolocation with at least one of the following: a tradition signage, a digital signage and a virtual signage.

3. The method of claim 1, wherein receiving the content comprises receiving each of the following: an advertisement content, a category associated with the advertisement, an optical code, a promotional code, an expiration date associated with the promotional code and a URL of a webpage, wherein the method further comprises:
   receiving the advertisement content, the advertisement comprising at least one of the following: a text, an image, an audio and a video;
   receiving the category;
   receiving the optical code;
   receiving each of the promotional code and the expiration date; and
   receiving the URL.

4. The method of claim 3, further comprising:
   identifying the category based on a user of the mobile computing device; and
   displaying the advertisement content associated with the category.

5. The method of claim 1, wherein receiving the content comprises receiving a URL of a webpage, the URL being uniquely associated with the geolocation, wherein the method further comprises:
   receiving the URL from the mobile computing device; and
   detecting a consumption of the content by the mobile computing device based on receiving the URL.

6. The method of claim 5, further comprising transmitting a cookie to the mobile computing device, wherein the cookie is configured to track user activity on the mobile computing device.

7. The method of claim 6, further comprising generating advertisement statistics based on detecting the consumption of the content.

8. The method of claim 7, wherein generating the advertisement statistics comprises generating at least one of the following statistics: a number of views of the content, a number of actions performed on the content, a number of saves performed on the content, and a number of shares performed on the content.

9. The method of claim 1, wherein receiving the first location and the second location of the mobile computing device comprises receiving the first location and the second location from a communication interface having a long-range communication interface configured to provide communication between an online platform for geolocation and time-based advertising.

10. The method of claim 1, wherein receiving the first location and the second location of the mobile computing device comprises receiving the second location from a communication interface having a short range communication interface and a long range communication interface, wherein the long range communication interface is configured to provide communication between an online platform for geolocation and time-based advertising and the mobile computing device, wherein the short range communication interface is configured to provide communication between a beacon and the mobile computing device, wherein the beacon is located in a vicinity of the geolocation.

11. The method of claim 10, further comprising:
   receiving a pin drop action from the mobile computing device, the pin drop action being received when the mobile computing device is within the radius of the geolocation;

storing all content within the radius and associating the content with the pin drop action in response to receiving the pin drop location within the radius of the geolocation;

receiving a selection to view all of the content corresponding to the pin drop action; and displaying all of the content based on the selection.

12. The method of claim 1, wherein receiving the first location and the second location from the mobile computing device comprises receiving the first location and the second location from the mobile computing device comprising a vehicle navigation system, the vehicle navigation system being configured to provide a map of proximate content.

13. A system for geolocation and time-based advertising, the online platform comprising:
   a memory storage;
   at least one processing unit, wherein the at least one processing unit is configured to:
      receive a first indication from a mobile device,
      enable, in response to the first indication, the mobile device for the following:
         a display of content associated with a geolocation when a direction of travel during a course of travel of the mobile device and a period of time during which the direction of travel occurred is consistent with a delivery condition associated with the content, and
         a tracking of locations and movements of the mobile device;
      receive a second indication from the mobile device, wherein the second indication comprises a detection of the mobile device at a first location, wherein the first location is within a radius of a geolocation associated with the content,
      track the mobile device in response to the second indication, wherein the at least one processing unit being configured to track the mobile device comprises the at least one processing unit being configured to track the direction of travel associated with the mobile device during the course of travel of the mobile device,
      receive a third indication from the mobile device, wherein the third indication comprises receiving a second location of the mobile device during the course of travel of the mobile device,
      compare the second location with the first location,
      determine the direction of travel of the mobile device during the course of travel from the first location to the second location based on the comparison, and
      deliver, when the delivery condition is met, the content to the mobile device; and
   at least one of the following communication interfaces:
      a short-range communication interface configured to provide communication between a beacon and the mobile device, and
      a long-range communication interface configured to provide communication between an online platform for geolocation and time-based advertising and the mobile device.

14. The system of claim 13, wherein the geolocation is associated with at least one of the following: a traditional signage, a digital signage, and a virtual signage.

15. The system of claim 13, wherein the content comprises each of the following: an advertisement content, a category associated with the advertisement, an optical code, a promotional code, an expiration date associated with the promotional code and a URL of a webpage, wherein the at least one processing unit is further configured to:
   receive the advertisement content, wherein the advertisement content comprises at least one of the following: a text, an image, an audio and a video,
   receive the category,
   receive the optical code,
   receive each of the promotional code and the expiration date, and
   receive the URL from the client device.

16. The system of claim 15, wherein the advertisement content comprises the following: the URL of the webpage, wherein the URL is uniquely associated with the geolocation, wherein the communication interface is further configured to receive the URL from the mobile device, wherein the at least one processing unit is further configured to detect a consumption of the advertisement content by the mobile device based on receiving the URL.

17. The system of claim 16, wherein the at least one processing unit is further configured to transmit a cookie to the mobile device, wherein the cookie is configured to track user activity on the mobile device.

18. The system of claim 16, wherein the at least one processing unit is further configured to generate advertisement statistics based on detecting the consumption of the advertisement content.

19. The system of claim 18, wherein the advertisement statistics comprises at least one of the following: a number of views of the advertisement content, a number of actions performed on the advertisement content, a number of saves performed on the advertisement content, and a number of shares performed on the advertisement content.

20. A method comprising:
   receiving a first indication from a user of a mobile device;
   enabling, in response to the first indication, the mobile device for the following:
      a display of content associated with a geolocation when a direction of travel of the mobile device during a course of travel, a period of time during which the direction of travel occurred, and a characteristic of the user are consistent with a delivery condition associated with the content,
      a tracking of locations, movements, and the direction of travel of the mobile device, and
      a tracking of a user interaction with the content;
   receiving a second indication from the mobile device, wherein receiving the second indication comprises receiving a first location of the mobile computing device;
   determining that the first location is within a radius of the geolocation having the content associated with the geolocation;
   tracking the mobile computing device in response to the second indication, wherein tracking the mobile device comprises tracking the mobile device during the course of travel;
   receiving a third indication from the mobile computing device, wherein the third indication comprises receiving a second location of the mobile computing device;
   comparing the second location with the first location;
   determining a direction of travel of the mobile device during the course of travel from the first location to the second location relative to the geolocation based on the comparison;
   retrieving a characteristic associated with a user of the mobile device;

determining whether to deliver the second content associated with the geolocation to the mobile computing device based on the direction of travel and the characteristic;
delivering, when the delivery condition is met, the content to the mobile device upon the determination;
receiving a fourth indication from the mobile device, wherein receiving the fourth indication comprises receiving the user interaction with the content;
initiating, in response to the fourth indication, the tracking of the user interaction; and
aggregating analytics associated with the user, the mobile device, the user interaction, and the content.

* * * * *